(12) United States Patent
Cai

(10) Patent No.: US 9,796,873 B2
(45) Date of Patent: Oct. 24, 2017

(54) LINEAR POLYGLYCIDYL AMINE ADDITIVES FOR CONTROLLED CROSSLINKING OF LATEX POLYMERS

(71) Applicant: Ennis Paint, Inc., Thomasville, NC (US)

(72) Inventor: Jiali Cai, High Point, NC (US)

(73) Assignee: Ennis Paint, Inc., Thomasville, NC (US)

( * ) Notice: Subject to any disclaimer, the term of this patent is extended or adjusted under 35 U.S.C. 154(b) by 0 days.

(21) Appl. No.: 15/013,013

(22) Filed: Feb. 2, 2016

(65) Prior Publication Data

US 2017/0218219 A1    Aug. 3, 2017

(51) Int. Cl.
| | | |
|---|---|---|
| *C09D 5/16* | (2006.01) | |
| *C08G 61/04* | (2006.01) | |
| *C09D 133/12* | (2006.01) | |
| *C09D 5/14* | (2006.01) | |
| *C08G 59/14* | (2006.01) | |
| *E01F 9/518* | (2016.01) | |

(52) U.S. Cl.
CPC ....... *C09D 133/12* (2013.01); *C08G 59/1494* (2013.01); *C09D 5/14* (2013.01); *E01F 9/518* (2016.02)

(58) Field of Classification Search
None
See application file for complete search history.

(56) References Cited

U.S. PATENT DOCUMENTS

| 2,136,928 A | 12/1935 | Schlack |
| 3,666,788 A | 5/1972 | Rowton |
| 4,772,680 A | 9/1988 | Noomen |
| 5,405,701 A | 4/1995 | Fujibayashi et al. |
| 5,498,659 A | 3/1996 | Esser |
| 5,939,482 A | 8/1999 | Kriessmann et al. |
| 6,437,059 B1 | 8/2002 | Tan et al. |
| 6,485,787 B2 | 11/2002 | Tan et al. |

FOREIGN PATENT DOCUMENTS

| EP | 555774 | 8/1993 |
| EP | 744450 | 11/1996 |
| EP | 778317 | 6/1997 |
| WO | 95/09209 | 4/1995 |
| WO | 96/16998 | 6/1996 |

OTHER PUBLICATIONS

Meyer, J et al.; "Poly(glycidyl amine) and Copolymers with Glycidol and Glycidyl Amine Repeating Units: Synthesis and Characterization". Macromolecules, 2011. vol. 44, pp. 4082-4091.
Carlotti, S et al.; "Living/Controlled Anionic Polymerization and Copolymerization of Epichlorohydrin with tetraoctylammonium Bromide-Triisobutylaluminum Initiating Systems". Macromolecules, 2008, pp. 7058-7062, vol. 41.
Gawdzik, B. et al.;"Synthesis of Glycidyl Amine Adducts and Their Copolymerization with Glycidyl Methacrylate". Journal of Applied Polymer Science, 2005. vol. 98, pp. 2461-2466.

*Primary Examiner* — Jessica E Whiteley
(74) *Attorney, Agent, or Firm* — Guerry L. Grune; ePatentManager

(57) ABSTRACT

Linear polyfunctional polyglycidyl amine oligomeric and/or polymeric structures exhibiting at least two primary amines are described, which provide crosslinking capabilities for latex paint compositions. These crosslinkers not only exhibit latent crosslinking properties but also improve scrub resistance when compared with existing latex formulations. Once the latex is coated onto a substrate, the volatile base evaporates and the groups react to form a crosslinked coating with improved scrub resistant properties.

22 Claims, 1 Drawing Sheet

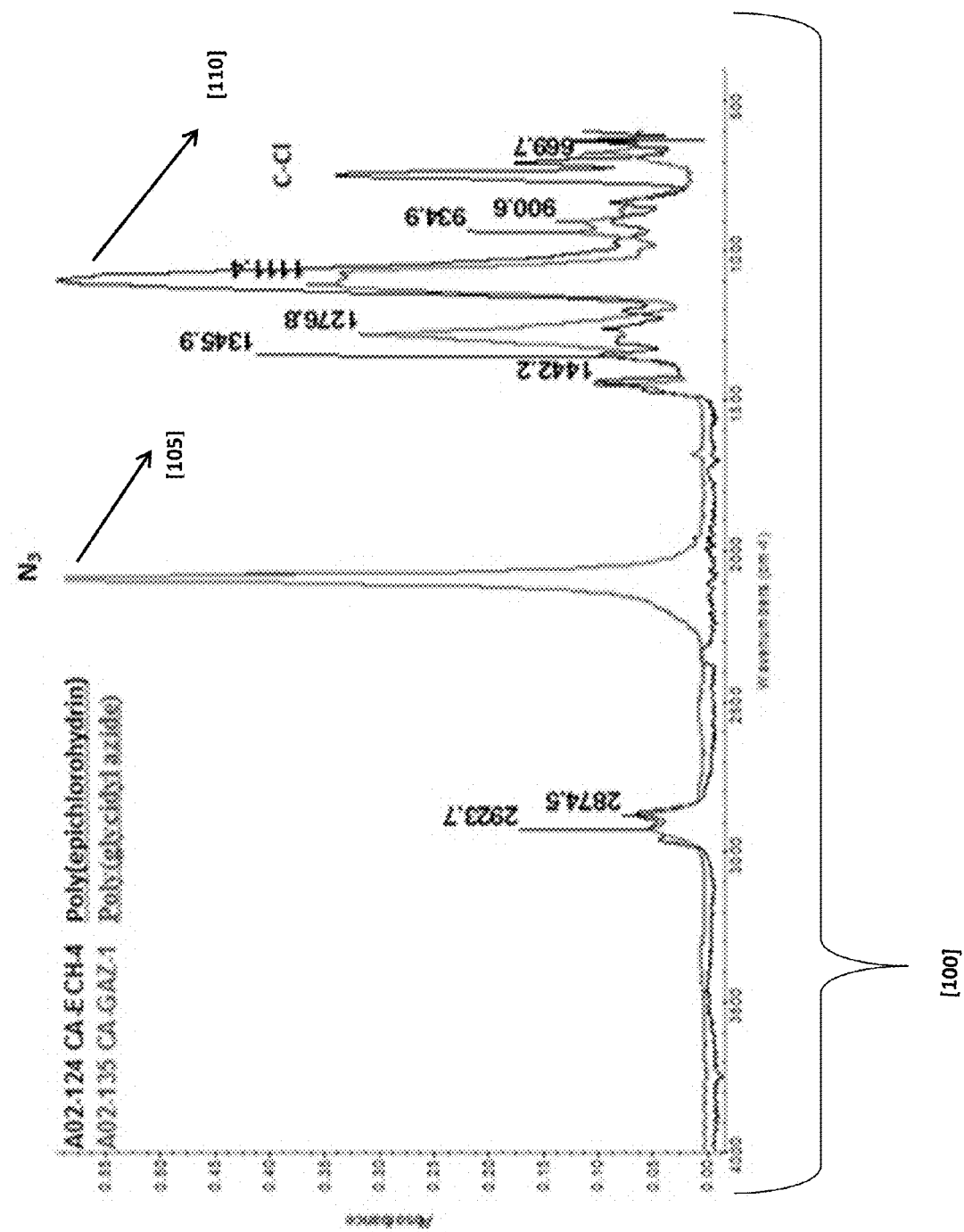

LINEAR POLYGLYCIDYL AMINE ADDITIVES FOR CONTROLLED CROSSLINKING OF LATEX POLYMERS

This non-provisional application incorporates by reference each and every aspect of U.S. Nonprovisional application Ser. No. 14/943,903 entitled "Polyfunctional Amines with Hydrophobic Modification for Controlled Crosslinking of Latex Polymers" filed on Nov. 17, 2015.

BACKGROUND

This disclosure covers the field of emulsion chemistry. In particular, it relates to distinct solution based polymerized latex compositions that are initially shelf stable emulsions prior to being used as coatings and/or paints. More specifically these latex compositions are kept shelf stable in the presence of a specific amount of ammonium hydroxide to maintain high pH in order to avoid premature interaction (pre-gelling) between latex particles leading to settling, and both inter and/or intraparticle crosslinking of the latex binders. These solutions are ammonia ($NH_3$) rich (using ammonium hydroxide) and thus highly basic; therefore, when the $NH_3$ evaporates quickly, the pH values of the solutions are reduced as they are applied to surfaces. This process serves as a trigger for controlled crosslinking of the latex (binder) as it interacts with the polyfunctional amines of the present disclosure during application and drying. The pursuit of fast drying aqueous traffic paints requires there be strong and effective interactions between the latex binder and water-soluble polyfunctional amine crosslinkers, to ensure fast hardening at proper high build (in a single coat thick application) translating into corresponding scrub resistance.

In an increasing number of industries, aqueous coating compositions continue to replace traditional organic solvent-based coating compositions. Paints, inks, sealants, and adhesives, for example, previously formulated with organic solvents are now formulated as aqueous compositions. This reduces potentially harmful exposure to volatile organic compounds (VOC's) commonly found in solvent-based compositions. Migration from organic solvent-based to aqueous compositions allows for health and safety benefits, however, the aqueous coating compositions must meet or exceed the performance standards expected from solvent-based compositions. The need to meet or exceed the organic solvent based performance standards places a premium on the characteristics and properties of waterborne polymer compositions used in aqueous coating compositions.

The latex industry and specifically the latex-based traffic paint products have historically held a long established goal of developing effective "one-pack" (proper high build—in a single coat thick application)—or single step crosslinking systems. The ideal system allows for film formation prior to substantial crosslinking as the latex is applied to surfaces. The nature of this coating technology requires that it is stable when being stored and fast drying only when being applied. The structural make-up of these aqueous systems must be unreactive in the wet state, but very capable of ionic bonding (in ambient conditions) in the dry state; referred to hereinafter as latent crosslinking. The result of latent crosslinking would be a good film-forming latex with excellent hardness that is very durable and scrub resistant.

Much published art regarding various "one-pack" chemistries exists, including those based on epoxies (specifically glycidyl methacrylate), silanes, isocyanates, and carbonyls (including acetoacetoxyethyl methacrylate, AAEM). Most of these publications and/or granted patents have demonstrated the presence of crosslinking by showing improved solvent resistance.

In order to increase the potlife (or shelf stability) of compositions containing acetoacetate and amine groups it has been known to block the amine groups of the polyamine with a ketone or aldehyde to form corresponding ketimine or aldimine compounds prior to mixing with an acetoacetate-functional polymer. Examples of such non-aqueous compositions are disclosed in U.S. Pat. No. 4,772,680. Even though improved stability may be achieved by specific aromatic aldimines, volatile by-products are still formed and the compositions have no application in waterborne coatings and are restricted to coatings using organic solvents as the carrier.

WO 95/09209 describes a crosslinkable coating composition comprising an aqueous film forming dispersion of addition polymer comprising acetoacetate functional groups and an essentially non-volatile polyamine having at least two primary amine groups and wherein the mole ratio of acetoacetate to primary amine groups is between 1:4 to 40:1.

EP 555,774 and WO 96/16998 describe the use of carboxylated acetoacetoxyethyl methacrylate latexes mixed with multifunctional amines (such as diethylene triamine) for a shelf-stable, one-component system. In EP 555,774, the system is stabilized by using vinyl acid polymerized with AAEM and the latex is "neutralized" with a polyamine. The patent teaches that the carboxyl groups should be 70 to 96 mol percent relative to the acetoacetoxy groups. WO 96/16998 similarly describes a polymerization process with the vinyl acid and AAEM being polymerized in the first stage.

EP 744,450 describes aqueous coating compositions containing acetoacetate functional polymers with a weight-average molecular weight of 100,000 or greater and which contain acetoacetate functional groups and acidic functional groups, and multifunctional amine.

EP 778,317 describes an aqueous self-crosslinkable polymeric dispersion comprising a polymeric component (a relatively hydrophobic polymer having a Hansch number >1.5, at least 5% of a carbonyl functional group capable of reacting with a nitrogen moiety, and at least 1% of a non-acidic functional group having hydrogen-bondable moieties); and a crosslinking agent comprising a nitrogen-containing compound having at least two nitrogen functional groups capable of reacting with a carbonyl functional moiety. Again it is reported that no gelation has taken place after ten days at 60° C.

U.S. Pat. No. 5,498,659 discloses a single-package aqueous polymeric formulation consisting essentially of an evaporable aqueous carrier, at least one polymeric ingredient having acid-functional pendant moieties able to form stable enamine structures, a non-polymeric polyfunctional amine having at least two amine functional moieties, and an effective amount of base for inhibiting gelation. It is stated in the patent that at least some of the crosslinking of the composition may take place in the liquid phase, possibly within one to four hours of adding the non-polymeric polyfunctional amine. It is postulated that addition of base to the reactor contents competes with the amine-functional moieties vis-à-vis the acetoacetoxy-type functional moieties, thereby reducing the degree of crosslinking and/or enhancing the colloidal stability of the polymer dispersion which forms when the crosslinking reaction takes place.

Geurink, et al., in their publication "Analytical Aspects and Film Properties of Two-Pack Acetoacetate Functional Latexes", Progress in Organic Coatings 27 (1996) 73-78, report that crosslinking of acetoacetate functional latexes with polyamine compounds is very fast, and that this crosslinking is hardly hindered by existing enamines. It is further stated that there are very strong indications that crosslinking takes place rapidly in the wet state, in or at the surface of the particles just after mixing of the components. They conclude that as a result of crosslinking in the particles, the film forming process is hampered.

Meyer et al, in their publication "Poly(glycidyl amine) and Copolymers with Glycidol and Glycidyl Amine Repeating Units; Synthesis and Characterization", Macromolecules 44 (2011) 4082-1091, describe polyethers with protected hydroxymethyl and chloromethyl side groups that were converted in three steps to poly(epoxide)s with hydroxymethyl and aminomethyl side chains. These polymers have a high potential for the preparation of multifunctional polymers since amine and alcohol groups can be reacted selectively by electrophiles. An intermediate in the synthesis of these functional poly(epoxide)s are polyethers with hydroxymethyl and azidomethyl side chains.

U.S. Pat. No. 5,405,701 provides a resin composition for an aqueous coating having as its main components (A) a resin having hydroxyl and cationic groups, (B) at least two glycidyl groups each in a glycidylamino group. The resulting resin can be used for electro-coating and can be cured at lower temperatures of 70-160° C. The curing agent (C) of the final resin composition is selected from the group consisting of lead, zirconium, cobalt, aluminum, manganese, copper, zinc, iron, bismuth, and nickel compounds.

U.S. Pat. No. 2,136,928, the first patent of epoxy resin chemistry, provides the first concept of linear nitrogen-containing polymers obtained by the addition of diepoxides and amines having two active hydrogen atoms linked to nitrogen, said nitrogen being linked to saturated carbon atoms. Substances of high molecular weight having a high content of basic nitrogen, in particular such as are not decomposed by strong acids or alkalis, are only known in a comparatively small number, which is still more limited as soon as the solubility in certain organic solvents is desired. Therefore, an improved process of producing resinous amines rich in nitrogen and a new kinds of resinous amines stable against the action of strong acids or alkalis and which are soluble in certain organic solvents were introduced.

Gawdzik et al., in their publication "Synthesis of Glycidyl Amine Adducts and Their Copolymerization with Glycidyl Methacrylate", Journal of Applied Polymer Science, Vol. 98, 2461-2466 (2005), provide a prospective group of acrylic polymers formed by aminoacrylates. These compounds are formed in the reactions of aliphatic or aromatic amines with epoxide groups of glycidyl compounds. This paper presents the synthesis of new adducts from glycidyl methacrylate and the following amines: aniline, p-phenylenediamine, 4,4-oxydianiline, 4,4-diaminodiphenylmethane, 4,4-diaminodiphenyl sulfone, 4,4-thiodianiline, and 4,4-diaminodicyclohexylmethane. The exemplary synthesis of the adduct of 4,4-oxydianiline and glycidyl methacrylate provides that the amounts of reagents were chosen in such a way that 2 mol of glycidyl compound reacted with 1 mol of amine. In the case of diamines 4 mol of glycidyl methacrylate was used. Non-linear glycidyl amine adducts are discussed which present high crosslinking degrees, high thermal stabilities, and extreme hardness.

U.S. Pat. No. 3,666,788 provides amines useful as curing agents in polyurea coatings, such as compounds of the formula

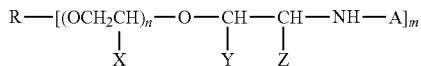

where R is the nucleus of an oxyalkylation-susceptible aliphatic polyhydric alcohol containing 2-12 carbon atoms and 2-8 hydroxyl groups, A is hydrogen, or a cyano-lower—alkyl radical having one or two carbon atoms between the nitrogen and cyano radical provided at least one A is a cyano-lower-alkyl radical, Z is an alkyl group containing 1-18 carbon atoms, X and Y are hydrogen or Z, n has an average value of 0-50 and m is 2-8. R is saturated and consists of carbon and hydrogen. The methyl and ethyl alkyl groups of A may be substituted with lower alkyl groups. These amines are useful as coupling agents for polymer formation and are particularly useful as curing agents in polyurea coatings, for example, sprayed polyurea coatings. The curing agents provided are linear curing agents for polyurethane spray coatings.

In the publications described above, the usable pot life of the latex formulations is demonstrated by lack of sedimentation. It is quite possible, however, that crosslinking is taking place within each particle, without causing the latex to coagulate or gel (e.g. loss of colloidal stability). This type of intra-particle crosslinking (before drying) limits the ability of the latex to form a film upon drying. This in turn reduces the film integrity and performance of the polymer. Therefore, a need still exists for truly latent linking or "crosslinking" systems—those in which intraparticle crosslinking is inhibited until after film formation. In particular, a need exists for "one-pack chemistry", which are latent crosslinking formulations that are useful over a wide range of latex applications which are simple and cost efficient. A "one pack system" refers to a single packaged system that provides the necessary premixed formulations that have adequate shelf life so that they can be applied where and when needed. The application for using such formulations further includes decorative and protective coatings, adhesives, non-woven binders, textiles, paper coatings, traffic markings, inks, etc. In each case, further advantages include the development of "soft" ductile polymers that convert to harder, more resistant latex films upon drying.

In general, the following acronyms are used throughout the body this specification and provide information regarding chemical compounds and structures as follows;
ADS=ammonium dodecyl sulfate
APS=ammonium persulfate
BA=butyl acrylate
DMF=dimethylformamide
ECH=epichlorohydrin
GAm=glycidyl amine
GAz=glycidyl azide
MAA=methacrylic acid
MMA=methyl methacrylate
$M_n$=number average molecular weight
pECH=poly(epichlorohydrin)
pGAm=polyglycidyl amine
pGAz=polyglycidyl azide
$Ph_3P$=triphenylphosphine
$Ph_3PO$=triphenylphosphine oxide
SDS=sodium dodecyl sulfate
$tBuNH_4Cl$=tetrabutylammonium chloride
$iBu_3Al$=triisobutylaluminium

SUMMARY

Amine linkers are water soluble polyfunctional amines establishing interactions with anionic latex particles when the pH and solid content of the dispersion media changes. Often this chemical phenomenon is commonly referred to as "crosslinking", which is a more general terminology that is not entirely accurate. The production of linear polyglycidyl amine homopolymers of varying molecular weights promoting such an interaction while maintaining extended shelf life using a "one pack system" that provides the necessary premixed formulations that can be applied where and when needed. The polyglycidyl amines (pGAm) exhibit high water solubility due to an ethoxylated backbone and pendant moieties containing primary amines dispersed along the molecular chain. Optimization of compositions of primary, secondary, and tertiary groups can be achieved through direct reaction of primary amine groups with other reactive groups. Linearity of the polyfunctional polyglycidyl amine crosslinkers has been found to surprisingly provide increased rheology control by allowing tailoring of viscosity and molecular weight in an efficient manner. Due to the presence of ethylene oxide moieties in the final composition, hydrophilicity is maintained provided the size of the R-substituent moieties do not cause significant steric hindrance or increase the bulkiness of the overall composition.

More specifically, the present disclosure describes a coating composition comprising;
(a) one or more anionically stabilized acrylic copolymers;
(b) one or more polyfunctional amines of a structure as provided by;

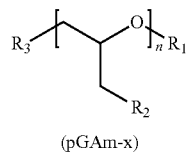

(pGAm-x)

and
c) at least one volatile base, wherein;.
wherein the substituent $R_1$ is —H;
and wherein the substituent $R_2$ is selected from group consisting of: —$NH_2$, methyl amine, ethyl amine, 1-propyl amine, ethanol amine, 2-propyl amine, 1-butyl amine, 2-butyl amine, 2-methyl-2-propyl amine, piperazine, N,N-dimethyl-ethyl diamine, N,N-diethyl-ethyl diamine, N,N-dimethyl propyl diamine, N,N-diethyl-propyl diamine, N,N-dimethyl amino propylamine, N,N-dimethyl ethylene amine, N,N-diethyl amino propylene amine, N,N-diethylamino ethylene amine, amino ethylpiperazine, N-methyl-1,2-ethane diamine, N-ethyl-1,2-ethane diamine, N-methyl-1,3-propane diamine, N-ethyl-1,3-propane diamine, 1,2-diamine ethane, 1,3-diamino propane, 1,4-diamino butane, cadaverine, cystamine, 1,6-diamino hexane, 1,2-diamine benzene, 1,3-diamino benzene, 1,4-diamino benzene, 1,4-diamino butanol, 4,4-diamino-3-hydroxy butanoic acid, 5-amino-1,3,3-trimethylcyclohexanemethylamine,2,2'-oxybis ethanamine, alanine, lysine, or other mono/di-functional primary amines, provided the molecular structure remains linear;
and wherein the sub stituent $R_3$ is —$NH_2$;
and where n is a number from 10 to 300;
and where the $M_n$=1,000 to 30,000;
and where pGAm-x is synthesized as the result of a three-step reaction process which includes a ring-opening reaction during nucleophilic substitution of a glycidyl moiety.

The coating composition is one or more polyfunctional amines that are homopolymers, and/or homo-oligomers designated as pGAm-1, wherein pGAm-1 is a chemical structure represented as;

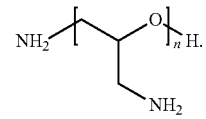

Further, the coating composition may be one or more polyfunctional amines that are one or more copolymers wherein pG-co-GAm-1 is a chemical structure represented as;

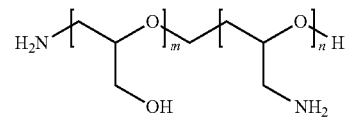

where m may or may not equal n and wherein m and n are numbers greater than 10 and less than 300.

Here the coating composition is one or more polyfunctional oligomeric/polymeric amines that provide cationic charge and a molecular weight that when placed in solution with a latex binder yields an aqueous based crosslinked polymer latex coating that forms better films, quicker drying times and increased scrub resistance in comparison with polymer latex coatings that do not contain these specific polyfunctional amines.

In another embodiment, an aqueous latex paint is described as comprising:
(a) one or more anionically stabilized acrylic copolymers;
(b) one or more polyfunctional amines of a structure as provided by;

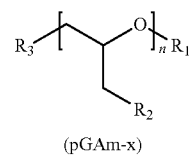

(pGAm-x)

and
c) at least one volatile base, wherein;.
wherein the sub stituent $R_1$ is —H;
and wherein the substituent $R_2$ is selected from group consisting of: —$NH_2$, methyl amine, ethyl amine, 1-propyl amine, ethanol amine, 2-propyl amine, 1-butyl amine, 2-butyl amine, 2-methyl-2-propyl amine, piperazine, N,N-dimethyl-ethyl diamine, N,N-diethyl-ethyl diamine, N,N-dimethyl propyl diamine, N,N-diethyl-propyl diamine, N,N-dimethyl amino propylamine, N,N-dimethyl ethylene amine, N,N-diethyl amino propylene amine, N,N-diethylamino ethylene amine, amino ethylpiperazine, N-methyl-1,2-ethane diamine, N-ethyl-1,2-ethane diamine, N-methyl-1,3-propane diamine, N-ethyl-1,3-propane diamine, 1,2-diamine ethane, 1,3-diamino propane, 1,4-diamino butane, cadaverine, cystamine, 1,6-diamino hexane, 1,2-diamine benzene, 1,3-diamino benzene, 1,4-diamino benzene, 1,4-diamino butanol, 4,4-diamino-3-hydroxy butanoic acid, 5-amino-1,3,3- trimethylcyclohexanemethylamine,2,2'-oxybis ethanamine, alanine, lysine, or other mono/di-functional primary amines, provided the molecular structure remains linear;

and wherein the sub stituent $R_3$ is —$NH_2$;

and where n is a number from 10 to 300;

and where the $M_n$=1,000 to 30,000;

and where pGAm-x is synthesized as the result of a three-step reaction process which includes a ring-opening reaction during nucleophilic substitution of a glycidyl moiety.

The aqueous latex paint includes or more polyfunctional amines are homopolymers, and/or homo-oligomers designated as pGAm-1, wherein pGAm-1 is a chemical structure represented as;

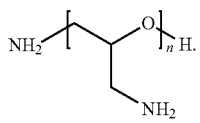

Further, the aqueous latex paint includes one or more polyfunctional amines that are one or more copolymers wherein pGco-GAm-1 is a chemical structure represented as;

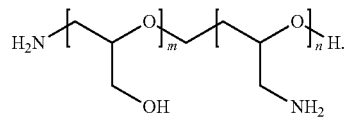

where m may or may not equal n and wherein m and n are a number greater than 10 and less than 300.

These latex paint formulations are both a latex and one or more polyfunctional amines that are combined.

The latex paint one or more polyfunctional oligomeric/polymeric amines provide cationic charge and molecular weight that when placed in solution with a latex binder yields an aqueous based crosslinked polymer latex coating that forms better films, quicker drying times and increased scrub resistance in comparison with polymer latex coatings that do not contain said polyfunctional amines.

These latex paints provides for dry times on paved surfaces in an atmosphere that is characterized as possessing at least 50% relative humidity with a final ΔKU value of no greater than 10.0, as measured using ASTM D711.

The latex paints provides for dry times on paved surfaces, in an atmosphere that is characterized as possessing at least 75% relative humidity, with a final ΔKU value of no greater than 10.0, as measured using ASTM D711.

The latex paints provide for improved scrub resistance as compared to aqueous latex paint by at least 10% using ASTM D2486.

The latex paint wherein the paint contains only white pigment.

The latex paint wherein the paint contains only yellow pigment.

The latex paint wherein the polyfunctional amine has a weight average molecular weight of 500 to 5,000,000 Daltons; more preferably from 1,000 to 50,000 and most preferably from 2000 to 20,000.

The latex paint wherein the polyfunctional amine has a number average molecular weight of between 1,000 and 30,000 Daltons.

The latex paints further include additional pigments, fillers, dispersants, coalescents, pH modifying agents, plasticizers, defoamers, surfactants, thickeners, biocides, co-solvents, and combinations thereof.

The latex paints additionally include additives integrated into the paint including rheology modifiers, wetting and spreading agents, leveling agents, conductivity additives, adhesion promoters, anti-blocking agents, anti-cratering agents and anti-crawling agents, anti-freezing agents, corrosion inhibitors, anti-static agents, flame retardants and intumescent additives, dyes, optical brighteners and fluorescent additives, UV absorbers and light stabilizers, chelating agents, cleanability additives, crosslinking agents, flatting agents, flocculants, humectants, insecticides, lubricants, odorants, oils, waxes and slip aids, soil repellants, stain resisting agents, and combinations thereof.

The latex paint also includes aqueous dispersions having a volume solids content of between 45 and 65% by weight of a total paint formulation.

The latex paint further includes aqueous dispersions having a volume solids content of between 60 and 77% by weight of a total paint formulation.

The latex paint is often applied to a surface selected from the group consisting of metal, asphalt, concrete, stone, ceramic, wood, plastic, polyurethane foam, glass, and combinations thereof.

The coating compositions may also be applied to a surface selected from the group consisting of metal, asphalt, concrete, stone, ceramic, wood, plastic, polyurethane foam, glass, and combinations thereof.

The latex paints which exist as a coating have dry thickness of between 10 mils and 100 mils.

In another embodiment, a method for preparing one of the pGAm-x structures obtaining pGAm-1 comprises a specific three-step synthesis reaction including;

(i) preparation of pECH as follows;

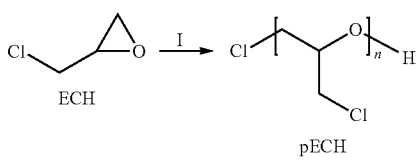

wherein I includes $iBu_3Al/tBuNH_4Cl$ in toluene at 0° C. in a nitrogen atmosphere'

(ii) preparation of pGAz as follows;

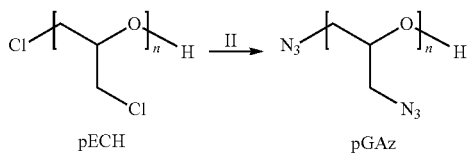

wherein II includes using sodium azide that in the presence of a DMF solvent at 100° C. yields pGAz, and
(iii) preparation of pGAm-1 as follows;

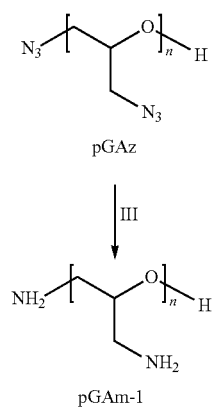

pGAz

↓ III pGAm-1 wherein III includes adding DMF and Ph₃P with water at room temperature to convert the pGAz to pGAm-1.

As stated above, the polyfunctional polyglycidyl amines of the present disclosure are the result of a three step substitution reaction process to provide, in this particular example, pGAm-1. The resulting polyfunctional amines using similar reaction conditions comprise at least two separate primary amino groups which are pH responsive and will accept or release proton(s) in response to a change in pH. These pGAm-x structures, and more specifically pGAm-1, shown above, are representative of one group of linear polyfunctional oligomeric/polymeric amines which possess the necessary cationic charge at lower pH values and molecular weight so that when placed in solution with the latex binder allows for providing a final aqueous based crosslinked polymer latex coating that forms proper films, is quick drying, and exhibits increased scrub resistance.

The linear polyfunctional polyglycidyl amines, as described herein, can be used in latex paint formulations to function as crosslinkers. Complete paint formulations utilizing both a latex and one or more polyfunctional polyglycidyl amines, or a combination of several polyfunctional polyglycidyl amines, as described, and provided herein, are also subjects of the present disclosure.

The paint formulations may additionally include at least one member of the group consisting of; dispersants, defoamers, surfactants, biocides, ammonia, rheology agents, pigments, solvents, coalescents, and water.

The paint formulations may be used as traffic paint on various pavement surfaces.

The paint formulations provide for paint that is applied to pavement surfaces such that crosslinking of the paint occurs and the paint dries within 15 minutes. The paint formulations using the polyfunctional polyglycidyl amines of the present disclosure impart substantially increased scrub resistance when compared with previously prepared latex paint formulations not using the linear polyfunctional amines disclosed herewith. Substantially increased scrub resistance is possibly due to the formation of a significant number of hydrogen bonds between the hydrogen of the amine groups and the oxygen of the carboxylates and/or oxygen from the ethoxylated backbone of the polyfunctional polyglycidyl amine, strengthening the connections between latex particles. In addition, the contribution of ionic bonding between the carboxylic acid anions and cationic polyfunctional polyglycidyl amines also plays a role in increasing scrub resistance of paints.

The mostly or completely linear polyfunctional polyglycidyl amine homopolymer/oligomer structures of the present disclosure provide the ability to more easily tailor the crosslinking capability, final molecular weight, and overall product viscosity of latexes.

DETAILED DESCRIPTION

The present invention provides special linear polyfunctional polyglycidyl amine homopolymer/oligomer crosslinkers for use in latex polymer emulsion compositions. The latex polymer emulsion compositions of the present invention typically include, but are not limited to, latexes, dispersions, microemulsions, and/or suspensions. The latex polymer compositions of the present invention may be stored at room temperature or moderately above room temperature (e.g., about 50 to 60° C.) thereby providing the desired, acceptable shelf life. Subsequently they provide adhesion and crosslinking upon film formation when applied to a substrate. A film or coating using with polymers of the present disclosure may be formed at room temperature or elevated temperatures The latex polymer binders used in the present disclosure are generally prepared as particles. The particles may be structured or unstructured. Structured particles include, but are not limited to, core/shell particles and gradient particles. The average polymer particle size may range from about 100 to about 300 nm.

The present disclosure includes compositions and methods for the preparation of water soluble polyfunctional polyglycidyl amine homopolymers/homo-oligomers along with the possibility of implementing copolymers, for use as crosslinking agents in solutions of latex emulsions, which have been shown to provide greatly enhanced scrub resistance upon drying. The oligomeric/polymeric polyglycidyl amine is synthesized in the previously detailed three-step synthesis process by first reacting an organohalogen epoxide, such as epichlorhydrin, with an initiator and catalyst producing polyepichlorhydrin (pECH).

The resulting pECH polymer product, shown by the Step 1 reaction, is reacted with an ionic solid salt, such as sodium azide. Conversion of chloromethyl groups to azidomethyl groups is confirmed by the FTIR spectrum [100] of pECH in comparison with pGAz. The peak of the carbon-chlorine bond (C—Cl, 741.8 cm$^{-1}$) [105] disappears after the conclusion of the Step 2 replacement reaction and the appearance of a strong peak indicating the presence of the azide bond (N=N=N, 2100 cm$^{-1}$) [110] is indicated, as shown in FIG. 1. The byproduct of this reaction is only sodium chloride (NaCl).

The conversion of pGAz to pGAm-x is achieved via a reduction reaction using a suitable reducing agent. Using the Staudinger reduction reaction, pGAz is dissolved in Step 3 into DMF with the addition of Ph₃P (triphenyl phosphine). A corresponding phosphine-imine is formed that is easily hydrolyzed by the addition of water to release the amine with byproducts of only gaseous nitrogen and hydrophobic Ph₃PO (triphenylphosphine oxide). The resulting water soluble polyfunctional polyglycidyl amines of the general structure pGAm-x serve to provide useful crosslinkers for latex paints. The determination of whether the resulting chemical compound structures are an oligomer or polymer depends on the final number and weight average molecular weights (as determined primarily by the number and molecular weight) of the repeating monomeric chains.

As the three-step reaction schema provides GRAS (generally regarded as safe) byproducts comprising; NaCl, gaseous nitrogen, and Ph$_3$PO, the products provided using these reactants/reactions are considered environmentally friendly. More specifically, running this reaction and obtaining the linear polyfunctional polyglycidyl amine polymer/oligomers, as well as any wastes generated during production, will not cause any known ecological harm to the environment. This issue has become an increasingly important consideration due to continued development of government regulations in most of the western industrial locations where these products will be manufactured and sold.

Fast drying due to crosslinking of the latex emulsion is triggered by rapid evaporation of NH$_3$ in the paint formulation concurrent with a drop in the pH of the emulsion during and after being applied to the intended surface. The interaction of the latex binder together with the crosslinking polyfunctional polyglycidyl amine (primarily) oligomers in the examples provided, results in fast dry traffic latex polymers (as paints or coatings) which are more durable. These polymeric/oligomeric amines provide for exceptional scrub resistant films. As previously discussed, substantially increased scrub resistance is possibly due to the formation of a significant numbers of hydrogen bonds between the hydrogen of the amine groups and the oxygen atoms contained in the carboxylates and/or oxygen from the ethoxylated backbone of the polyfunctional polyglycidyl amine resulting in the strengthening of bonding with the latex particles. In addition, the contribution of ionic bonding between the carboxylic acid anions and cationic polyfunctional polyglycidyl amines also plays a role in increasing scrub resistance of paints.

The waterborne scrub resistant paint serves as road and pavement marking paint which can be used to mark lines or symbols on roads, parking lots, and walkways etc.

The synthesis of the polyfunctional amine crosslinkers of the present disclosure can be completed utilizing the three-step synthesis process described. Possibilities exist in optimizing the compositions contained herein through reaction of the primary amine(s) of the pGAm-x compound with various reactive moieties.

Synthesis Reactions: Polyfunctional Polyglycidyl Amines (pGAm-x)

As described earlier, one aspect of the present disclosure involves utilizing polyfunctional polyglycidyl amine crosslinkers comprising recurring units derived from a three-step synthesis reaction process beginning with one glycidyl moiety and resulting in a polyfunctional polyglycidyl amine of the general formula (pGAm-x):

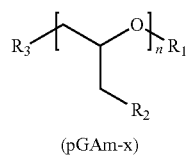

(pGAm-x)

where the pGAm-X homopolymer/oligomer includes the structural repeating unit (n) and
wherein the substituent R$_1$ is —H,
and wherein the substituent R$_2$ is selected from group consisting of: —NH$_2$, methyl amine, ethyl amine, 1-propyl amine, ethanol amine, 2-propyl amine, 1-butyl amine, 2-butyl amine, 2-methyl-2-propyl amine, piperazine, N,N-dimethyl-ethyl diamine, N,N-diethyl-ethyl diamine, N,N-dimethyl propyl diamine, N,N-diethyl-propyl diamine, N,N-dimethyl amino propylamine, N,N-dim-ethyl ethylene amine, N,N-diethyl amino propylene amine, N,N-diethylamino ethylene amine, amino ethyl-piperazine, N-methyl-1,2-ethane diamine, N-ethyl-1,2-ethane diamine, N-methyl-1,3-propane diamine, N-ethyl-1,3-propane diamine, 1,2-diamine ethane, 1,3-diamino propane, 1,4-diamino butane, cadaverine, cystamine, 1,6-diamino hexane, 1,2-diamine benzene, 1,3-diamino benzene, 1,4-diamino benzene, 1,4-diamino butanol, 4,4-diamino-3-hydroxy butanoic acid, 5-amino-1,3,3-trimethylcyclohexanemethylamine,2,2'-oxybis ethanamine, alanine, lysine, or other mono/di-functional primary amines, provided the molecular structure remains linear;
and wherein R$_3$ is —NH$_2$;
and where n is a number 1 to 300;
and where M$_n$=1,000 to 30,000;
and where pGAm-x is synthesized as the result of a three-step reaction process which includes a ring-opening reaction during nucleophilic substitution of a glycidyl moiety as described herein.

In order to prepare a polyether with aminomethyl sidegroups of tailored molecular weight, epichlorhydrin (ECH), the glycidyl monomer example of this disclosure, was polymerized using tBuNH$_4$Cl as an initiator and iBu$_3$Al as a catalyst.

The molecular weights were determined using the following GPC methodology for amine testing in aqueous solutions. An HPLC Waters 2695 unit with selective gel permeation columns designated as; Guard and one 30 cm PL Aquagel-OH Mixed-M 8 μm columns was used. The detectors for this equipment included a Waters 410 Differential Refractometer (RI) with a Viscotek Dual Detector 270—(RALS, DP, IP, LALS). The running solvent used was deionized water with 0.2% ethylenediamine (EDA).

The polyglycidyl amine crosslinker samples were diluted in DI water and filtered through 0.22 um PTFE filters into 1.5 mL vials and run through the GPC system at a flow rate of 1.0 mL/min. Each vial had a run time of 30 minutes to allow samples to be entirely flushed out before the next run. To find the molecular weights, a set of polyethylene glycol (Oxide) (PEO) samples were run to provide a calibration curve ranging from 232 to over one million Daltons. Omnisec software was used to create a method to fit the molecular weight distributions of the amine samples to the calibration curve of the standardized PEG samples.

The present disclosure involves the use of crosslinkers for the preparation of final latex polymer compositions containing at least one polyglycidyl amine primarily acting as a component for ionic bonding. An example of a homopolymer or homo-oligomer (depending on the number and size of the repeating units) resulting in a polyglycidyl amine of the present disclosure has been designated as pGAm-1 and is schematically represented again below;

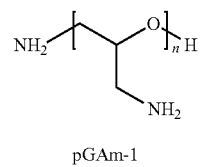

pGAm-1

An example of a copolymer resulting from preparing polyglycidyl amines according to the present disclosure has been designated [pG-co-GAm-1] and is schematically represented below;

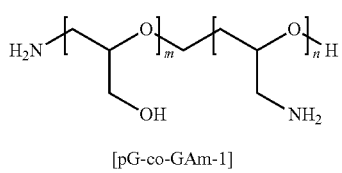

[pG-co-GAm-1]

where m may or may not equal n;
and wherein m and n are values greater than 10 and less than 300.

Processes for Preparation of pGAm-x Crosslinkers:

A general method for achieving the reaction leading to the linear polyglycidyl amine, pGAm-1, as represented above is as follows;

A solution of a quaternary ammonium salt and an organochlorine epoxide was dissolved in toluene under a nitrogen atmosphere. The polymerization was started by adding an anhydrous toluene solution (25 wt. %) of an organoaluminum compound at a constant temperature of 0° C. The reaction mixture was kept overnight at this temperature. After polymerization (complete monomer conversion) toluene was removed under reduced pressure. The poly(organochloride epoxide) was dissolved in dimethylformamide and ionic sodium azide was added to the solution. The reaction mixture was stirred at 110° C. for 18 h and then the reaction was stopped. The precipitate was filtered off and then dimethylformamide and an organophosphorus compound were added to the liquid mixture at room temperature. The reaction mixture was stirred for 2 h and subsequently water was added, the reaction was stopped after 12 h. The solvents were removed under reduced pressure. The polymer was dissolved in water, and an oxide of an organophosphorus compound was filtered off. The product, pGAm-x was isolated as yellowish oil. Varying and tailored molecular weights of the resulting pGAm-x can be achieved.

Here, equation (1) describes how the wt. % of the polyamine is determined:

weight % polyamine=weight of reactants/total weight (w/water)     (1)

In at least one embodiment, the crosslinkers made from the substitution chemistry of the present disclosure should include at least two primary amino group sites that are responsive to change in pH and will accept or release proton(s) in response to such a change in pH.

EXAMPLE 1

Synthesis of Amine Linker pGAm-1

From poly(epichlorohydrin) to poly(glycidyl azide) to poly(glycidyl amine)

The synthesis of the structure of the polyglycidyl amine compound (pGAm-1), as provided in Steps 1, 2, and 3, was performed using the following detailed three-step procedure as summarized in Table 1; a solution of 26.9 g tetrabutylammonium chloride (tBuNH$_4$Cl) and 116.4 g epichlorohydrin (ECH) was dissolved in 350.0 ml toluene under a nitrogen atmosphere. The polymerization was started by adding an anhydrous toluene solution (25 wt. %) of triisobutylaluminium (iBu$_3$Al), 125.0 ml, at a constant temperature of 0° C. The reaction mixture was kept overnight at this temperature. After polymerization (complete monomer conversion) toluene was removed under reduced pressure. 100.0 g pECH was dissolved in 350 ml dimethylformamide (DMF) and 98.2 g sodium azide was added to the solution. The reaction mixture was stirred at 110° C. for 18 h and then the reaction was stopped. The precipitate was filtered off and then 150 mL DMF and 372.4 g triphenylphosphine (Ph$_3$P) were added to the liquid mixture at room temperature. The reaction mixture was stirred for 2 h and subsequently 100 ml water was added, the reaction was stopped after 12 h. The solvents were removed under reduced pressure. The polymer was dissolved in water, triphenylphosphine oxide was filtered off. The pGAm-1 product was isolated as yellowish oil. The molecular weight of the resulting pGAm-1 is $M_n$=2470 with dispersity of 1.7.

EXAMPLES 2 AND 3

Example 2—pGAm-2 & Example 3—pGAm-3

The procedure for the synthesis of the polyglycidyl amines of Examples 2 and 3 (pGAm-2 and pGAm-3), was the same as that used to synthesize the pGAm-1 polyfunctional amine of Example 1.

Modification of the amount of the reactants have been provided and summarized in Table 1. Example 2 provides a molecular weight of $M_n$=4690 g/mol with Example 3 presenting a molecular weight of $M_n$=6050. Both examples, pGAm-2 and pGAm-3 have a polydispersity of 1.8.

TABLE 1

Summary of Method of Preparation of pGAm-x Linkers

| | | Example 1 pGAm-1 | Example 2 pGAm-2 | Example 3 pGAm-3 |
|---|---|---|---|---|
| Step 1 Synthesis of pECH | ECH, g | 116.4 | 85.0 | 87.5 |
| | tBuNH$_4$Cl, g | 26.9 | 17.5 | 8.8 |
| | iBu$_3$Al, g | 125.0 | 25.0 | 25.0 |
| | Toluene, ml | 350.0 | 150.0 | 200 |
| | Reaction Temperature, ° C. | 0 | 0 | 0 |
| Step 2 Synthesis of pGAz | pECH, g | 100.0 | 66.4 | 75 |
| | Sodium azide, g | 98.2 | 53.6 | 63.0 |
| | DMF, ml | 350.0 | 350 | 150 |
| | Reaction temperature, ° C. | 110 | 115 | 105 |
| Step 3 Synthesis of pGAm-x | pGAz, g | 74.0 | 66.4 | 50.5 |
| | Ph$_3$P, g | 372.4 | 211.1 | 147.0 |
| | DMF, ml | 150.0 | 450 | 450 |
| | Reaction temperature, ° C. | 25 | 25 | 25 |

Method of Making Crosslinkable Latex Polymers

The latex polymer compositions of the present invention will have various properties, often depending on end-use applications. In general, the polymer components have glass transition temperatures (Tg) of 15 to 40° C. and more preferably 20 to 30° C.

The weight average molecular weight of the latex polymer compositions may vary from about 5,000 to 5,000,000 Daltons; more preferably from 20,000 to 2,000,000 and most preferably from 40,000 to 100,000.

Particle size of the latex compositions has been determined to be 224.8 nm with a ζ-potential of 55.9 mV. Solids content of the latex compositions have been determined to be 50.1%.

A waterborne polymer composition may be prepared using the latex polymer composition of the present invention along with other known additives and may also employ other emulsion polymerization methodologies.

The examples below are illustrative of the preparation of latex polymers and waterborne polymer compositions, according to one aspect of the present invention.

First a latex seed must be prepared. This is described below in detail;

A 2 liter reactor was charged with 210.9 g SDS solution (14% of the total solution), (sodium dodecyl sulfate), 4.6 g NaHCO$_3$, 503.3 g water, 158.0 g BA, 189.5 g MMA, 6.8 g MAA and 16.2 g APS. The solution was mechanically stirred and heated to 65 C. Radical polymerization occurred immediately and caused the temperature to rise quickly. The exotherm was controlled using 410.1 g water which was added gradually over a period of four minutes. The seed solution was allowed to react for another 130 minutes to ensure the reaction proceeded to completion. The latex particle size obtained was determined to be 51 nm.

Latexes or other waterborne compositions containing small particle sized seed polymers range from about 25 to about 700 nm, preferably from about 50 to about 500 nm and more preferably from about 75 to about 300 nm and represent one embodiment of latexes used in the present invention.

Next, it was necessary to prepare the latex. This procedure was performed as follows:

The desired amounts of ADS (15.3 g) and deionized (DI) water (375.0 g) were each added to a 2000 ml beaker. After the surfactant is used for full dissolution in water, BA (406.2 g), MMA (487.2 g) and MAA (10.5 g) were added to the beaker to prepare a pre-emulsion. Next, DI (deionized) water, ammonium carbonate, and seed latex with weights as shown in Table 2 were added to the kettle at a temperature of 81° C. The temperature of the kettle decreased due to the addition of the mixture. As the kettle temperature increased to 81° C., the split initiator APS (2.3 g) was added. The pre-emulsion mixture (1293.8 g) and initiator (0.9 g) in DI water (39.4 g) were concurrently added into kettle at a constant rate over a period of 3h. After final addition of all of the ingredients required for the pre-emulsion, the temperature of the kettle was held at 81° C. for additional 1 h to digest the residual monomers. The latex was then filtered through a 300 mesh screen to remove any coagulum. Table 2 provides the process steps and corresponding weights of each constituent required to complete the synthesis of the latex—Example 4—for the paints described below.

TABLE 2

Latex Synthesis - Example 4

| | Material | Gram (g) |
|---|---|---|
| Initial charge in kettle | DI Water | 320.0 |
| | Ammonium carbonate | 3.5 |
| | Seed latex | 38.3 |
| | APS | 2.3 |
| Pre-emulsion | Water | 375.0 |
| | ADS | 15.3 |
| | BA | 406.2 |
| | MMA | 487.2 |
| | MAA | 10.5 |
| Delayed oxidizer | APS | 0.9 |
| | DI water | 39.4 |
| Post oxidizer | APS | 0.5 |
| | DI water | 30.2 |

Once the latex polymerization yielding the latex binder was complete, it was possible to complete the process by producing latex paints.

The following examples are intended to illustrate, not limit, the invention:

Control Example (White Paint)

The polyfunctional amine of Example 1 (pGAm-1) was added to the latex binder (Example 4) to make traffic paint, Paint 1. Addition of the polyfunctional polyglycidyl amine of Example 2 (pGAm-2) to the latex binder of Example 4 provided the traffic paint, Paint 2. The polyfunctional polyglycidyl amine of Example 1 (pGAm-3) was added to the latex binder (Example 4) to make traffic paint, Paint 3. The traffic paint from the polymer binder Example 4 without polyfunctional polyglycidyl amine addition was formulated as the control.

The following components, shown in Table 3 below, were also added in the order shown to produce the respective pigmented traffic paint compositions. The latex binders and polyglycidyl amines were mixed for 15 minutes to achieve a smooth dispersion between the pigment and the extender, which in this specific case is methyl alcohol.

TABLE 3

Latex Paint Preparations Using pGAm-1, pGAm-2, & pGAm-3 Crosslinkers

| | Constituents | Paint 1, g pGAm-1 | Paint 2, g pGAm-2 | Paint 3, g pGAm-1 | Control, g |
|---|---|---|---|---|---|
| A | Latex | 444.0 | 444.0 | 444.0 | 444.0 |
| | Amine | 0.73 | 0.55 | 0.04 | 0 |
| | Dispersant | 8.0 | 8.0 | 8.0 | 8.0 |
| | Surfactant | 2.5 | 2.5 | 2.5 | 2.5 |
| | Defoamer | 8.0 | 8.0 | 8.0 | 8.0 |
| | Antimicrobial | 0.2 | 0.2 | 0.2 | 0.2 |
| | Thickener | 0.2 | 0.2 | 0.2 | 0.2 |
| | Water | 19.6 | 19.6 | 19.6 | 19.6 |
| | Ammonia (30%) | 1.7 | 1.7 | 1.7 | 1.7 |
| B | Attagel 50 | 2.8 | 2.8 | 2.8 | 2.8 |
| | Minspar 4 Silica | 156.0 | 156.0 | 156.0 | 156.0 |
| | TiO2 | 70.0 | 70.0 | 70.0 | 70.0 |
| | Calcium carbonate | 615.0 | 615.0 | 615.0 | 615.0 |
| C | Methyl alcohol | 30.0 | 30.0 | 30.0 | 30.0 |
| | Propylene glycol | 5.6 | 5.6 | 5.6 | 5.6 |
| | Eastastripe | 20.0 | 20.0 | 20.0 | 20.0 |

Test Methods

The results of all employed test methods are provided in Table 4, entitled "Performance of atex Compositions Containing pGAm-x Crosslinkers".

Dry to No Pick Up Time

Drawdown samples were prepared via the procedure provided below:

The final traffic paint formulations were drawn down over 10 cm×30 cm glass test panels to form a layer of the traffic paint composition thereon. The thickness of the layer was controlled to approximately 380 microns. The test panels were promptly placed in a test chamber and maintained at a desired relative humidity of 75 percent with wind speed of 2 miles per hour at 75° F. The test chamber was equipped with a certified hygrometer and a certified temperature indicator, both of which were fastened to the center of the rear wall of the test chamber to ensure balanced measurement. Prior to positioning the test panels inside the test chamber, a pan at the bottom of the test chamber was filled with 2 cm of water and all the ports and doors were closed. The test chamber was allowed to equilibrate overnight. After overnight equilibration, the relative humidity within the test chamber reached 100 percent. By carefully opening and closing the various chamber ports, the relative humidity within the chamber was brought to the desired relative humidity of 75 percent. The dry-to no pick up time was determined in accordance with ASTM D-711 by rolling a traffic paint drying wheel over the wet film. The end point for the dry-to-no-pickup time is defined as the point in time where no paint adheres to the rubber rings of the test wheel.

Storage Stability

The traffic paints were tested for consistency in accordance with ASTM D562-10 by using Brookfield KU-2 Viscometer. The traffic paint composition samples were placed in sealed 0.25 L containers and stored in a sealed circulation oven at 60° C. for two weeks. The containers were then removed from the oven and allowed to cool to room temperature for 24 hours. The containers were opened, mixed for 3 minutes on a mechanical mixer and immediately tested again for consistency under ASTM D562-10. The stored traffic paint was rated to have passed the storage stability test if the traffic paint composition consistency, as measured in Krebs units (KU), did not increase by more than ±10 KU from measurement before storage in the oven.

Scrub Resistance

The traffic paints were tested according to ASTM D2486-12 using an Elcometer 1720 abrasion tester. First, the test paint and reference paint were thoroughly stirred, and then drawdown panels of the test and reference paints were prepared side by side, perpendicular to the length of the panel following procedures outlined:

Drawdown of the paint formulations on the black plastic panels, using the same operator and the same 0.18-mm (7.0-mil) clearance film applicator, was performed for the test and reference paints. Three drawdowns were prepared for each test paint and reference paint. The paints were drawn down simultaneously and the painted portion was positioned in the middle of the chart. Air drying of the drawdown panels was achieved in a horizontal position for 7 days in a conditioning chamber at 23±2° C. (73.5±3.5° F.) and 50±5% relative humidity in accordance with ASTM specification-D3924.

The brush was soaked in water overnight. The plate was cleaned and it was set in the pan of the washability machine. Two shims were centrally placed, one each under the test paint and one under the reference paint drawdown areas on the chart. Test panels were carefully wiped and placed on top of the shimmed plate with the painted side up. It was observed that there were no defects in the film above the shims and that the test areas were level. The gasket was placed over the painted surface and clamped in place. The brush was removed and shaken vigorously to remove any excess water. Before testing, the brush was conditioned for 400 cycles. The brush was again removed and shaken vigorously to remove any excess water. The abrasive scrub medium was stirred and 10 g of the medium was spread uniformly over the brush bristles. The brush was placed at one end of the path. The panel moistened with 5 mL of water in the path of the brush and the test was started. After each 400 cycles before failure, the brush was removed without rinsing and 10 g of stirred abrasive scrub medium was added to the brush. Next, 5 mL of water was placed on the path of the brush before continuing. It is recommended that the first two panels to be tested are prepared by altering the position of the reference paint, that is, one panel has the reference paint on the right, and the second panel has the reference paint on the left. The number of cycles to remove one continuous thin line of paint film from both the test and reference paints across the 12.7-mm (½-in.) width of each of the shims was recorded. The machine was stopped and the shim areas were wiped off to determine, if necessary, if each end point was achieved. Two of the drawdowns were tested. If the two results displayed a difference of more than 30%, the third drawdown was tested. If one of the three results is obviously discrepant, it was discarded the results from the remaining drawdowns were averaged.

Evaluation on Dry to No Pick Up Time, Storage Stability, and Scrub Resistance

The traffic paints of Paint 1, Paint 2, Paint 3, plus the control paint were applied to achieve a wet film thickness of approximately 380 microns on glass test panels. The panels were evaluated for dry-to-no-pickup times, storage stability, and scrub resistance in accordance with the procedures described above. The test results are shown in Table 4 below:

TABLE 4

Performance of Latex Compositions Containing pGAm-1, pGAm-2, and pGAm-3 Crosslinkers

|  | Paint 1 | Paint 2 | Paint 3 | Control |
|---|---|---|---|---|
| Dry to no pick up time (min) | 7.0 | 12.0 | 8.0 | 14.0 |
| Storage stability |  |  |  |  |
| KU before storage | Fail 81.3 | Pass 88.7 | Pass 82.5 | Pass 85.0 |
| KU after storage at 60° C. for one week | 92.0 ΔKu = 10.7 | 98.0 ΔKu = 9.3 | 89.7 ΔKu = 7.2 | 92.9 ΔKu = 7.9 |
| Scrub % relative to control, % | 156.7 | 149.6 | 104.0 | 100 |

It is seen from Table 4 that traffic paints Paint 1 and Paint 3 (pGAm-1 and pGAm-3, respectively) have dry to no pickup times that are significantly lower than that of the control which contains no polyamine homopolymer.

Paint 2 has lower dry time relative to the control. Paint 1 almost passed the storage stability test limit of 10 KU by recording a 10.7 KU value. Paints 2 and 3 pass the storage stability test as control. For scrub resistance, Paint 1 provided the highest (best) values.

Surfactants

In the present disclosure, an anionic surfactant was used for latex synthesis. The type of anionic surfactants provided are not limited to: sodium dodecyl sulfate (SDS), ammonium dodecylsulfate (ADS), disodium salt of ethoxylated lauryl sulfosuccinate and sodium benzyl dodecyl sulfate.

The polyfunctional amines and subsequent waterborne latex based paint compositions of the present disclosure are also useful for a variety of formulations such as; architectural, metal, wood, plastic, textile, cementitious and paper coatings as well as for inks and adhesives.

Examples of such coating formulations adapted for particular uses include, but are not limited to, corrosion inhibitors, concrete coatings, maintenance coatings, latex paints, industrial coatings, automotive coatings, textile backcoatings, surface printing inks and laminating inks. Accordingly, the present invention relates to such coating formulations and preferably water-based latexes according to this disclosure. The compositions of the present disclosure may be incorporated in those coating formulations in the same manner as with other known latexes and used with conventional components and/or additives of such compositions. These coating formulations may be clear or pigmented. With their crosslinking ability, adhesion and resistance properties, the water-based latexes of the present invention impart new and/or improved properties to various coating formulations.

Upon formulation, the coating/paint formulations containing the compositions of the present disclosure may then be applied to a variety of surfaces, substrates, or articles, e.g., paper, plastic, steel, aluminum, wood, gypsum board, concrete, brick, masonry, or galvanized sheeting (either primed or unprimed). The type of surface, substrate, or article to be coated generally determines the type of coating formulation used. The coating formulation may be applied using means known in the art. For example, a coating formulation may be applied by spraying or by coating a substrate. In general, the coating may be dried by heating but preferably would be allowed to air dry.

As a further aspect, the present disclosure relates to a shaped or formed article which has been coated with coating formulations described in detail above.

Additives or fillers used in formulating coatings include, but are not limited to, leveling, rheology, and flow control agents such as silicones, fluorocarbons, urethanes, or cellulosics; extenders; curing agents such as multifunctional isocyanates, multifunctional carbonates, multifunctional epoxides, or multifunctional acrylates; reactive coalescing aids such as those described in U.S. Pat. No. 5,349,026; flatting agents; pigment wetting and dispersing agents and surfactants; ultraviolet (UV) absorbers; UV light stabilizers; tinting pigments; extenders; defoaming and antifoaming agents; anti-settling, anti-sag and bodying agents; anti-skinning agents; anti-flooding and anti-floating agents; fungicides and mildewcides; corrosion inhibitors; thickening agents; plasticizers; reactive plasticizers; drying agents; catalysts; crosslinking agents; or coalescing agents. Specific examples of such additives can be found in *Raw Materials Index*, published by the National Paint & Coatings Association, 1500 Rhode Island Avenue, NW, Washington, D.C. 20005.

A waterborne paint or coating composition of the present disclosure can be utilized alone or in conjunction with other conventional waterborne polymer system. These polymer systems include, but are not limited to, water dispersible polymers comprising polyesters, polyester-amides, cellulose esters, alkyds, polyurethanes, epoxy resins, polyamides, and acrylics.

The present disclosure and associated invention has been described in detail with particular reference to embodiments thereof, but it will be understood that variations and modifications can be effected within the spirit and scope of the invention. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein as well as combinations of steps, elements, components, and constituents are included though not explicitly stated. The term "comprising" and variations thereof as used herein are used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth, used in the specification and claims, are to be understood at the very least, and not as an attempt to limit the application of the doctrine of equivalents to the scope of the claims, and not to be construed in light of the number of significant digits and ordinary rounding approaches.

We claim:

1. A coating composition comprising;
   (a) one or more anionically stabilized acrylic copolymers;
   (b) one or more polyfunctional amines of a structure as provided by;

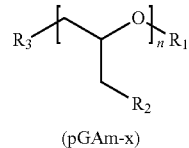

(pGAm-x)

and
   c) at least one volatile base, wherein;
   wherein the sub stituent $R_1$ is —H;
   and wherein the substituent $R_2$ is selected from group consisting of: —$NH_2$, methyl amine, ethyl amine, 1-propyl amine, ethanol amine, 2-propyl amine, 1-butyl amine, 2-butyl amine, 2-methyl-2-propyl amine, piperazine, N,N-dimethyl-ethyl diamine, N,N-diethyl-ethyl diamine, N,N-dimethyl propyl diamine, N,N-diethyl-propyl diamine, N,N-dimethyl amino propylamine, N,N-dimethyl ethylene amine, N,N-diethyl amino propylene amine, N,N-diethylamino ethylene amine, amino ethyl-piperazine, N-methyl-1,2-ethane diamine, N-ethyl-1,2-ethane diamine, N-methyl-1,3-propane diamine, N-ethyl-1,3-propane diamine, 1,2-diamine ethane, 1,3-diamino propane, 1,4-diamino butane, cadaverine, cystamine, 1,6-diamino hexane, 1,2-diamine benzene, 1,3-diamino benzene, 1,4-diamino benzene, 1,4-diamino butanol, 4,4-diamino-3-hydroxy butanoic acid, 5-amino-1,3,3-trimethylcyclohexanemethylamine, 2,2'-oxybis ethanamine, alanine, lysine, or other mono/di-functional primary amines, provided the molecular structure remains linear;
   and wherein the sub stituent $R_3$ is —$NH_2$;
   and where n is a number from 10 to 300;
   and where the $M_n$=1,000 to 30,000;
   and where pGAm-x is synthesized as the result of a three-step reaction process which includes a ring-opening reaction during nucleophilic substitution of a glycidyl moiety.

2. The coating composition of claim 1, wherein said one or more polyfunctional amines are homopolymers, and/or homo-oligomers designated as pGAm-1, wherein said pGAm-1 is a chemical structure represented as;

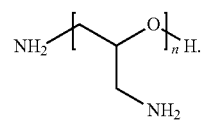

3. The coating composition of claim 1, wherein said one or more polyfunctional amines provide cationic charge and molecular weight that when placed in solution with a latex binder yields an aqueous based crosslinked polymer latex coating that forms better films, quicker drying times and increased scrub resistance in comparison with polymer latex coatings that do not contain said polyfunctional amines.

4. An aqueous latex paint comprising:
(a) one or more anionically stabilized acrylic copolymers;
(b) one or more polyfunctional amines of a structure as provided by;

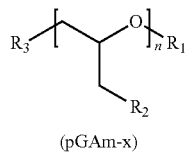

(pGAm-x)

and
c) at least one volatile base, wherein;
the substituent $R_1$ is —H;
and wherein the substituent $R_2$ is selected from group consisting of: —$NH_2$, methyl amine, ethyl amine, 1-propyl amine, ethanol amine, 2-propyl amine, 1-butyl amine, 2-butyl amine, 2-methyl-2-propyl amine, piperazine, N,N-dimethyl-ethyl diamine, N,N-diethyl-ethyl diamine, N,N-dimethyl propyl diamine, N,N-diethyl-propyl diamine, N,N-dimethyl amino propylamine, N,N-dimethyl ethylene amine, N,N-diethyl amino propylene amine, N,N-diethylamino ethylene amine, amino ethyl-piperazine, N-methyl-1,2-ethane diamine, N-ethyl-1,2-ethane diamine, N-methyl-1,3-propane diamine, N-ethyl-1,3-propane diamine, 1,2-diamine ethane, 1,3-diamino propane, 1,4-diamino butane, cadaverine, cystamine, 1,6-diamino hexane, 1,2-diamine benzene, 1,3-diamino benzene, 1,4-diamino benzene, 1,4-diamino butanol, 4,4-diamino-3-hydroxy butanoic acid, 5-amino-1,3,3-trimethylcyclohexanemethylamine,2,2'-oxybis ethanamine, alanine, lysine, and other mono/di-functional primary amines, provided the molecular structure remains linear;
and wherein the substituent $R_3$ is —$NH_2$;
and where n is a number from 10 to 300;
and where the $M_n$=1,000 to 30,000;
and where pGAm-x is synthesized as the result of a three-step reaction process which includes a ring-opening reaction during nucleophilic substitution of a glycidyl moiety.

5. The aqueous latex paint of claim 4, wherein said one or more polyfunctional amines are homopolymers, and/or homo-oligomers designated as pGAm-1, wherein said pGAm-1 is a chemical structure represented as;

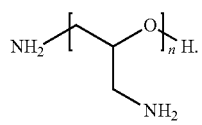

6. The latex paint formulation of claim 4, wherein both a latex and said one or more polyfunctional amines are combined.

7. The latex paint of claim 4, wherein said one or more polyfunctional amines provide cationic charge and molecular weight that when placed in solution with a latex binder yields an aqueous based crosslinked polymer latex coating that forms better films, quicker drying times and increased scrub resistance in comparison with polymer latex coatings that do not contain said polyfunctional amines.

8. The latex paint of claim 4, wherein said paint provides for dry times on paved surfaces in an atmosphere that is characterized as possessing at least 50% relative humidity with a final ΔKU value of no greater than 10.0, as measured using ASTM D711.

9. The latex paint of claim 4, wherein said paint provides for dry times on paved surfaces, in an atmosphere that is characterized as possessing at least 75% relative humidity, with a final ΔKU value of no greater than 10.0, as measured using ASTM D711.

10. The latex paint of claim 4 wherein said paint provides for improved scrub resistance as compared to said aqueous latex paint by at least 10% using ASTM D2486.

11. The latex paint of claim 4, wherein said latex paint contains white pigment.

12. The latex paint of claim 4, wherein said latex paint contains yellow pigment.

13. The latex paint of claim 4, wherein said polyfunctional amine has a weight average molecular weight of 500 to 5,000,000 Daltons.

14. The latex paint of claim 4, wherein said polyfunctional amine has a number average molecular weight of between 1,000 and 30,000 Daltons.

15. The latex paint of claim 4, wherein said paint includes additional pigments, fillers, dispersants, coalescents, pH modifying agents, plasticizers, defoamers, surfactants, thickeners, biocides, co-solvents, and combinations thereof.

16. The latex paint of claim 4, wherein said paint includes additional additives integrated into said paint including rheology modifiers, wetting and spreading agents, leveling agents, conductivity additives, adhesion promoters, anti-blocking agents, anti-cratering agents and anti-crawling agents, anti-freezing agents, corrosion inhibitors, anti-static agents, flame retardants and intumescent additives, dyes, optical brighteners and fluorescent additives, UV absorbers and light stabilizers, chelating agents, cleanability additives, crosslinking agents, flatting agents, flocculants, humectants, insecticides, lubricants, odorants, oils, waxes and slip aids, soil repellants, stain resisting agents, and combinations thereof.

17. The latex paint of claim 4, wherein said paint includes aqueous dispersions having a volume solids content of between 45 and 65% by weight of a total paint formulation.

18. The latex paint of claim 4, wherein said paint includes aqueous dispersions having a volume solids content of between 60 and 77% by weight of a total paint formulation.

19. The latex paint of claim 4, wherein said paint is applied to a surface selected from the group consisting of metal, asphalt, concrete, stone, ceramic, wood, plastic, polyurethane foam, glass, and combinations thereof.

20. The coating composition of claim 1, wherein said composition is applied to a surface selected from the group consisting of metal, asphalt, concrete, stone, ceramic, wood, plastic, polyurethane foam, glass, and combinations thereof.

21. The latex paint of claim 4, wherein said paint exists as a coating that has a dry thickness of between 10 mils and 100 mils.

22. A method for preparing one of the pGAm-x structures of claim 1, wherein obtaining pGAm-1 comprises a specific three-step synthesis reaction including;

(i) preparation of pECH as follows;

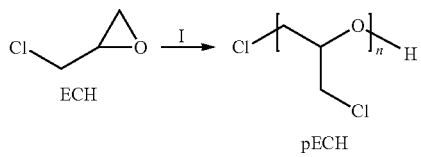

wherein I includes iBu₃Al/tBuNH₄Cl in toluene at 0° C. in a nitrogen atmosphere'

(ii) preparation of pGAz as follows;

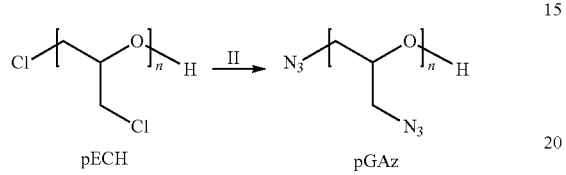

wherein II includes using sodium azide that in the presence of a DMF solvent at 100° C. yields pGAz, and (iii) preparation of pGAm-1 as follows;

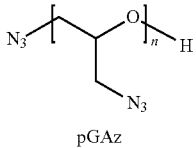

wherein III includes adding DMF and Ph₃P with water at room temperature to convert said pGAz to pGAm-1.

* * * * *